United States Patent [19]

Fickling et al.

[11] Patent Number: 5,267,659

[45] Date of Patent: Dec. 7, 1993

[54] COMPACT DISPLAYER

[76] Inventors: Phillip L. Fickling, 804 Sirius Dr.; Thomas K. Bowker, 301 Pine Ave., both of, Colorado Springs, Colo. 80906

[21] Appl. No.: 827,063

[22] Filed: Jan. 28, 1992

[51] Int. Cl.⁵ .............................................. A47G 29/00
[52] U.S. Cl. ...................................... 211/40; 211/195; 206/387; 220/23.4
[58] Field of Search ............... 211/40, 41, 195, 189; 220/23.4, 23.2, 666, 6, 7; 206/387; 312/9.1, 13, 9.9; 403/403, 401, 382, 205, 295

[56] References Cited

U.S. PATENT DOCUMENTS

| | | | |
|---|---|---|---|
| 3,635,350 | 1/1972 | Wolf | 211/40 |
| 3,759,395 | 9/1973 | Juhlin | 211/40 |
| 3,856,145 | 12/1974 | Bartholomew | 211/40 |
| 4,317,603 | 3/1982 | Pepicelli | 312/9 |
| 4,399,912 | 8/1983 | Mollen | 206/387 |
| 4,723,662 | 2/1988 | Johnson | 211/41 |
| 4,741,438 | 5/1988 | Mastronardo et al. | 211/40 X |
| 5,010,709 | 4/1991 | Paz | 403/205 X |
| 5,072,835 | 12/1991 | Price, Jr. et al. | 211/41 X |
| 5,160,027 | 11/1992 | Wu | 220/23.4 X |

*Primary Examiner*—Blair M. Johnson

[57] ABSTRACT

A modular storage rack for holding one or more containers, or objects, of a parallelepiped configuration. A plurality of racks may be connected together in a contiguous fashion by means of a coupling mechanism. The size of the storage rack is such that a plurality of racks, when attached to one another, by means of the afore mentioned coupling device, will have approximately the same external dimensions of one or more of the containers or objects held within the rack.

Each storage rack is comprised of two entitles joined by a hinge mechanism. Each entity consists of a right parallelepiped shape containing a slot or groove. When the two entities are folded, by means of the afore mentioned hinge, and held perpendicular to one another, by means of a locking mechanism, the storage rack will hold one or more of the containers or objects in a fashion that allows easy removal from the storage rack.

2 Claims, 4 Drawing Sheets

COMPACT DISPLAYER

BACKGROUND

1. Field of Invention

This invention relates to racks for storing articles of a right parallelepiped configuration, such as cases or containers for component audio discs, magnetic recording tape cassettes, computer disc files, video tape cartridges, or the like, so that when a finite number of single storage rack units are coupled together, the units create a rack whose dimensions are approximately the same as one or a plurality of the right parallelepiped articles being stored and will allow for the racks to be packaged with the articles without creating additional packaging configurations.

2. Description of Prior Art

A number of storage racks that accommodate objects of a right parallelepiped configuration presently exist. There are two prior art devices that have some similarities to the present invention. The rack described in U.S. Pat. No. 4,399,912 has a base and a plurality of channels that allow tape cassettes to be slid into the channels and are secured by a backstopping device. Another rack described in U.S. Pat. No. 4,723,662 includes a series of grooves or slots which defines a right angle corner in which the corner of the parallelepiped shape container can be rested. Although both prior art devices referenced possess similar characteristics, neither one is based on the single unit module and has a similar size relationship to the articles being stored.

OBJECTS AND ADVANTAGES

Accordingly one object of the present invention is to provide a storage rack for the storage of containers of right parallelepiped configuration which is a single unit, that can be coupled together in a infinite plurality.

Another object of the present invention is to provide a storage rack for the storage of containers of right parallelepiped configuration which is approximately the same size as one or more of the containers being stored. Still another object of the present invention is to provide a storage rack for the storage of containers of right parallelepiped configuration that allows for the easy removal of the containers by exerting downward pressure on the upper forward corner of a single container causing it to pivot on the edge created by the forward entities forward end and the forward article supporting surface lifting the rear of the container out of the rack minimizing wear on the container.

SUMMARY OF THE INVENTION

Accordingly it is a primary object of the present invention to provide a holding device for various types of objects, or containers of a right parallelepiped configuration such as the type of container used to store compact audio discs.

A specific object of the present invention is to hold the aforementioned object or container in an orderly in an orderly fashion allowing easy removal and minimizing wear and tear of the objects or containers. An additional object of the present invention is demonstrated when a plurality of the devices are joined together by means of their respective coupling mechanisms. When joined, a plurality of the devices shall approximately equal the size of the object or container the device is meant to hold. This feature of the invention has certain advantages which relate to packaging and marketing.

One example that will be noted is demonstrated when a plurality of the inventions are included in a standard compact audio disc shipping carton of the type commonly used by direct mail audio merchandising firms, with no modifications to the shipping carton.

Yet another desirable characteristic of the present invention is that because of the device's small size and low cost it leads itself to being marketed as a premium or give-away item. An illustration of this characteristic is that the said device may be included in the packaging of each individual compact audio disc at little or no extra charge to the retail consumer. Thus, as a collection of compact audio discs grow, so does the means by which they may be stored.

As will be demonstrated, the device may have sufficient grooves, or slots to accommodate a plurality of objects or containers. The advantage of this is that a device with more storage capacity will not cost proportionally more to manufacture than a device with the ability to hold only one object or container. This simply means that the unit cost of storing each object or container will significantly drop according to the capacity of the device.

Another advantage of this is that a single unit, possessing multiple storage capacity, can have approximately the same external dimensions as the object or container it is meant to hold.

Additional objects and advantages of the invention will be set forth in part in the description that follows, and in part will be obvious from the description, or may be learned by practice of the invention.

BRIEF DESCRIPTION OF THE DRAWINGS

FIG. 7 is a perspective view of a plurality of racks, as shown in FIG. 2, holding a plurality of objects or containers of a right parallelepiped configuration, as shown in FIG. 6B.

Figure 1:
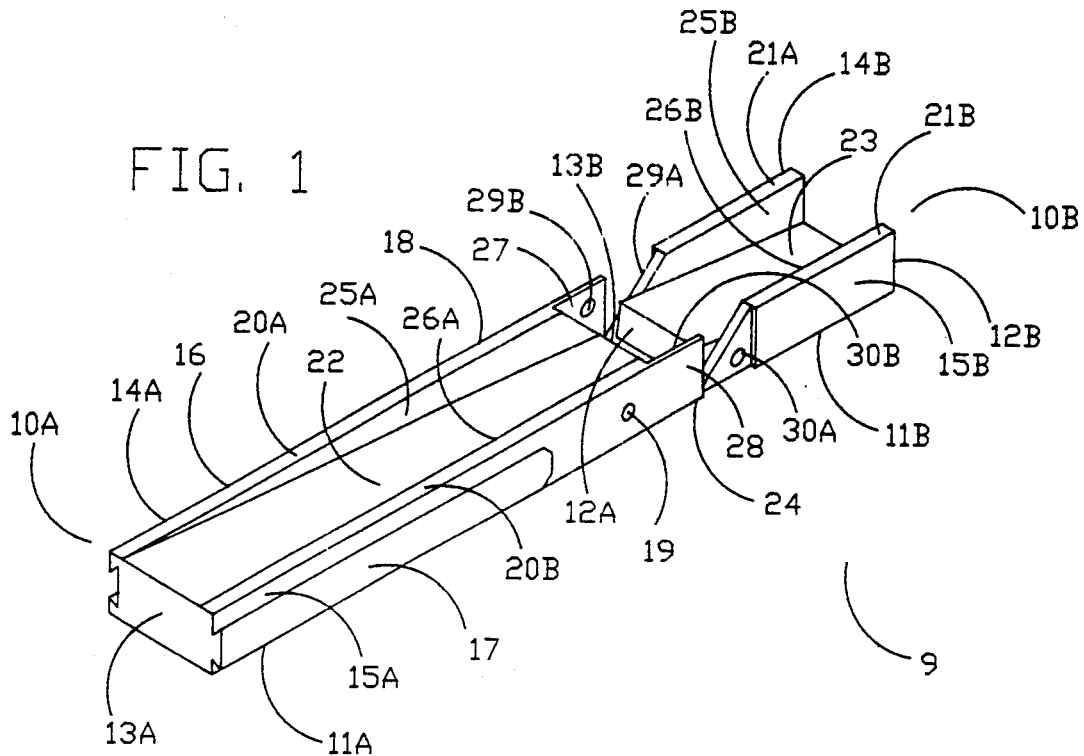
FIG. 1 is a perspective view of the rack of the invention shown in the flat, or open position.

DRAWING REFERENCE NUMERALS 9 the object of the invention
10A forward entity
10B rear entity
11A forward entity lower side
11B rear entity lower side
12A front side of rear entity
12B rear side of rear entity
13A front side of forward entity
13B rear side of forward entity
14A forward entity left end face
14B rear entity left end face
15A forward entity right end face
15B rear entity right end face
16 left coupling mechanism groove
17 right coupling mechanism
18 left coupling mechanism lock
19 right coupling mechanism lock
20A left forward entity upper side
20B right forward entity upper side
21A left rear entity upper side
21B right rear entity upper side
22 forward horizontal article supporting surface
23 rear vertical article supporting surface
24 hinge mechanism
25A left forward lateral article supporting surface
25B left rear lateral article supporting surface
26A right forward lateral article supporting surface
26B right rear lateral article supporting surface
27 left locking tab
28 right locking tab
29A left locking ball
29B left locking socket
30A right locking ball
30B right locking socket
31 object or container

DETAILED DESCRIPTION OF THE INVENTION

Referring now to the drawings, a modular storage rack constructed in accordance with the teachings of the present invention is illustrated.

The rack 9, as can clearly be seen in FIG. 1, is of unitary construction, being molded of a synthetic resin or plastic material.

The rack 9 essentially consists of two separate entities joined by an integral hinge. As can be seen in FIG. 1, there is a relatively large forward entity 10A and a smaller rear entity 10B.

As shown in FIG. 1, the rack 9 is characterized by having a horizontally extending lower side 11A and 11B which incorporates an integral hinge which lies perpendicular to the long axis of the device and serves to connect the forward entity 10A to the rear entity 10B.

Figure 2:
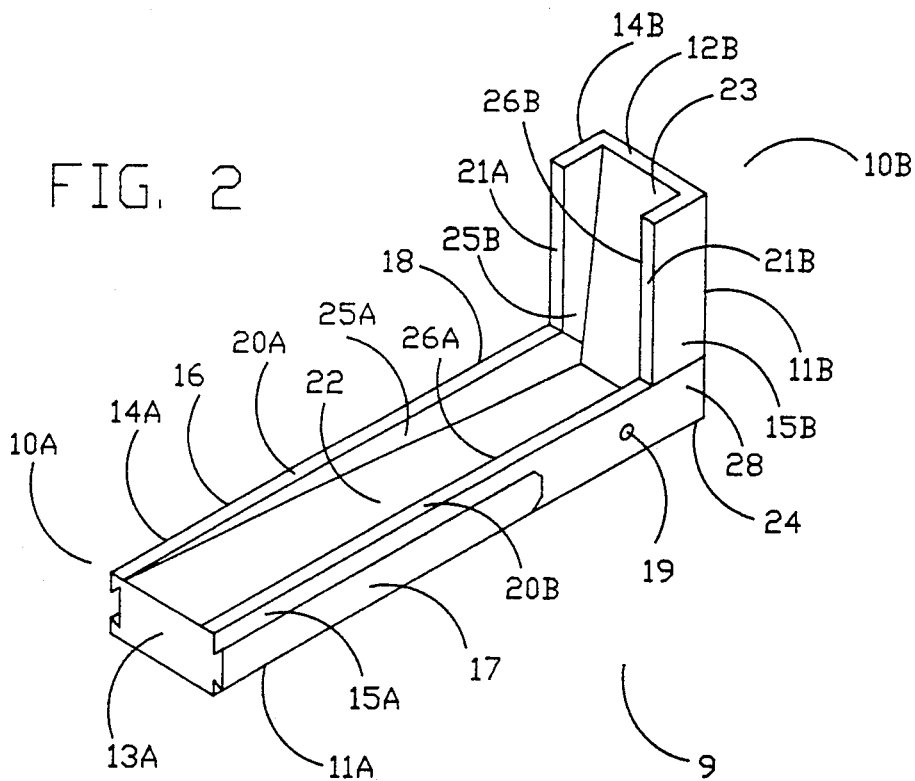
FIG. 2 is a perspective view of the rack shown in FIG. 1 in the folded, or closed position.
Figure 6A:
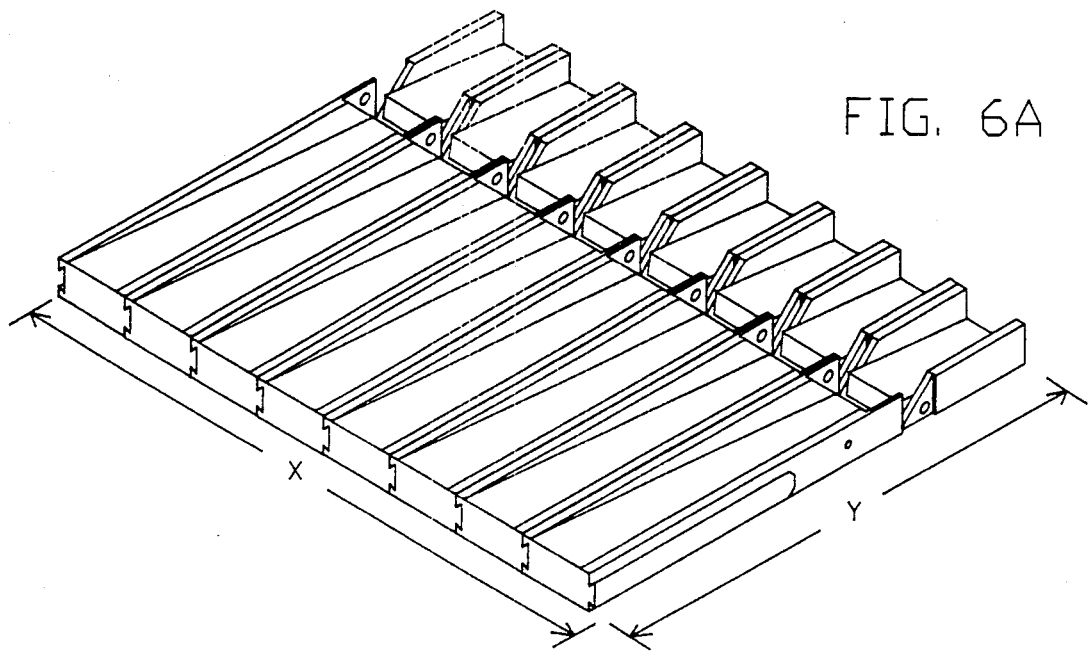
FIG. 6A is a perspective view showing a plurality of racks, as shown in FIG. 2, connected in a contiguous fashion by means of their respective coupling devices.
Figure 6B:
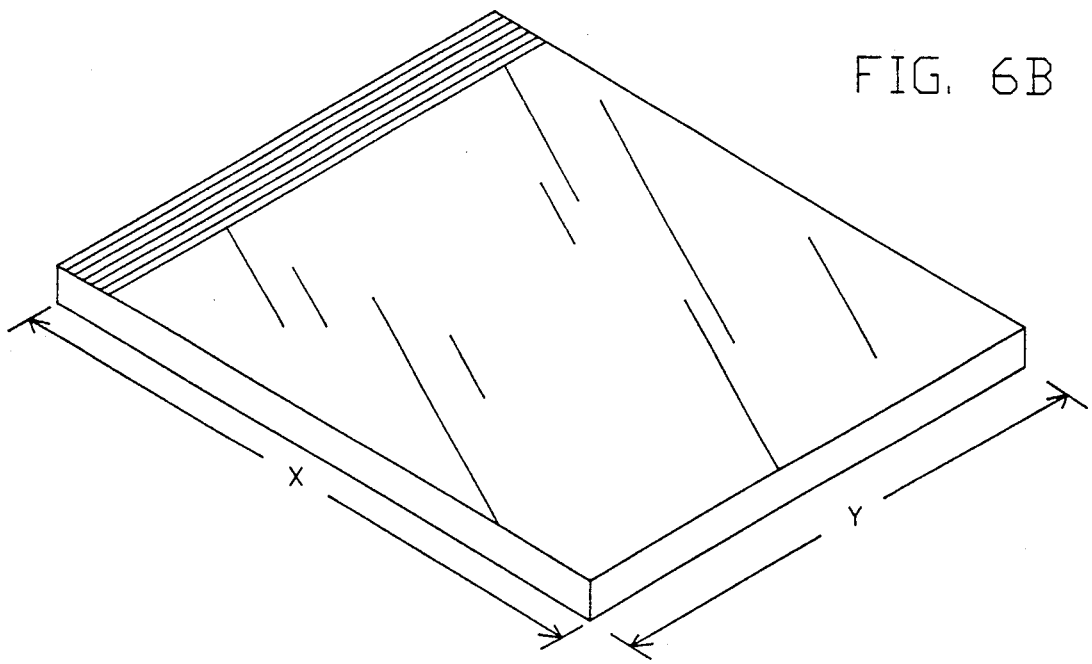
FIG. 6B is a perspective view showing an object or container of a right parallelepiped configuration. The object or container, having the same X and Y dimensions as the X and Y dimensions of a plurality of racks as shown in FIG. 6A.

The rack 9 has a rear side 12 which extends vertically from the lower side of the rear entity 10B, as shown in FIG. 2, the rear side 12 is of a generally rectangular shape with a substantial amount of it's surface area removed to facilitate the acceptance of a portion of an object or container of right parallelepiped configuration such as a compact audio jewel box as shown in FIG. 6B.

Referring now to FIG. 1, the rack 9 has a forward or front side 13 that extends vertically from the lower side of the forward entity and terminates at the forward edge of the horizontal article supporting surface 22.

This front side, being of a generally rectangular shape has, projecting from it's right side, in the same plane, a dove-tail shape which constitutes the end surface of the right coupling mechanism 17. On the left of the forward side 13, lying in the same plane, there has been an area removed, of a dove-tail shape, which constitutes the terminus of the left coupling mechanism groove 16.

The rack 9 has a left end face 14A that extends vertically from the lower side 11A of the forward entity 10A, and terminates at the edge of the left forward entity upper side 20A. Extending horizontally and to the rear from the front side 13 to a point two thirds of the length of the forward entity 10A is a dove-tail shaped cavity that has been removed from the surface of the left end face 14A of the forward entity 10A.

Lying in a parallel plane to the left end face 14A and rising vertically from the lower side 11A to the edge of the right upper side is the right end face 15A of the forward entity 10A, projecting from, and lying parallel to, the right end face 15A is the right coupling mechanism 17. This projection is characterized as a dove-tail shaped extrusion that extends horizontally and to the rear from the front side 13 to a point two thirds of the length of the right end face 15A of the forward entity 10A. This dove-tail shaped extrusion constitutes the right coupling mechanism 17.

The rear entity 10B of the rack 9 has, extending vertically, from the left edge of it's lower side 11B a left end face 14B which lies in the same plane as the left forward end face 14A.

The rear entity also has, extending vertically from the right edge of it's lower side 11B, a right end face 15B which lies in a parallel plane to the left end face 14B and is identical to said face.

The forward entity 10A has an upper side 20A which is characterized as a horizontally extending surface which lies in a parallel plane to the lower side 11A. The upper side of the forward entity 20A is defined by a pair of opposite end faces, a front side extending between the end faces, and a rear side extending between the end faces. The upper side of the forward entity has a substantial amount of it's surface area removed to facilitate the acceptance of an object or container of right parallelepiped configuration as shown in FIG. 6B. The said removal of surface area results in the creation of two opposed parallel surfaces referred to as the left forward entity upper side 20A and the right forward entity upper side 20B.

The rear entity 10B has an upper side, similar to the upper side of the forward entity 10A, and is characterized as a horizontally extending surface which lies in a parallel plane to the lower side 11B. The upper side of the rear entity has a substantial amount of it's surface area removed to facilitate the acceptance of an object or container of right parallelepiped configuration as shown in FIG. 6B. The aforementioned removal of surface area results in the creation of two opposed parallel surfaces referred to as the left rear upper side 21A and the right rear upper side 21B.

The forward entity 10A has an article supporting surface 22 which extends downward from the top of the front side 13A and terminates at the rear end of the lower side 11A of the forward entity 10A. This surface, which lies in a substantially horizontal plane, is defined by two parallel opposed lateral article supporting surfaces 25A and 26A which extend vertically and terminate at the horizontally extending surfaces of the forward entity's 10A upper side 20A and 20B.

The rear entity has an article supporting surface which, when the rack 9 is in an open or unlocked position FIG. 1, lies in a substantially parallel plane to the forward entity article supporting surface 22, but as the rear entity 10B is rotated into the locked position FIG. 2 this surface becomes the rear vertical article supporting surface 23. This surface is defined by two parallel opposed lateral article supporting surfaces 25B and 26B which extend vertically and terminate at the horizontal surfaces of the rear entity's 10B upper side 21A and 21B. When the rack 9 is in the open or unlocked position FIG. 1, the rear article supporting surface 23 is also defined by the top of the rear entity front side 12A and the rear entity rear side 12B.

The forward entity 10A has two parallel opposed lateral supporting surfaces 25A and 26A which extend vertically from the forward article supporting surface 22 and terminate at the horizontal plane of the forward entity's upper side 20A and 20B. The lateral supporting surfaces 25A and 26A are also defined by the forward 13A and rear 13B ends of the forward article supporting surfaces.

The rear entity 10B also has two parallel opposed lateral supporting surfaces 25B and 26B which, when the rack 9 is in the open or unlocked position FIG. 1, extend vertically from the rear article supporting surface 23 and terminate at the horizontal surfaces of the rear entity's 10B upper side 21A and 21B. The lateral supporting surfaces 25B and 26B are also defined by the front side 12A and the rear side 12B of the rear entity 10B.

The rack 9 utilizes a locking mechanism to secure the folded or closed position. The locking mechanism is located at the rear of the forward entity 10A and consists of two generally vertical planes called locking tabs 27 and 28.

Figure 3:
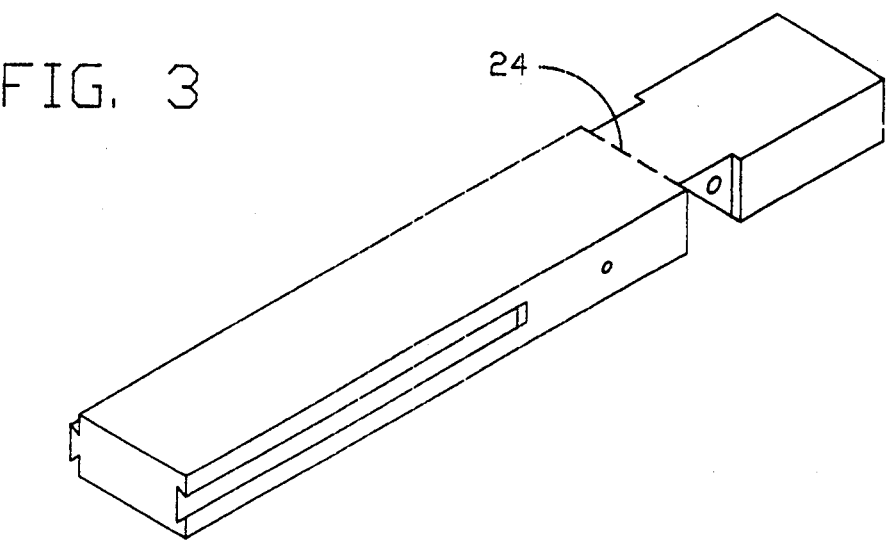
FIG. 3 is a perspective view of the rack in an upside-down position illustrating the location of the hinge mechanism.
Figure 4B:
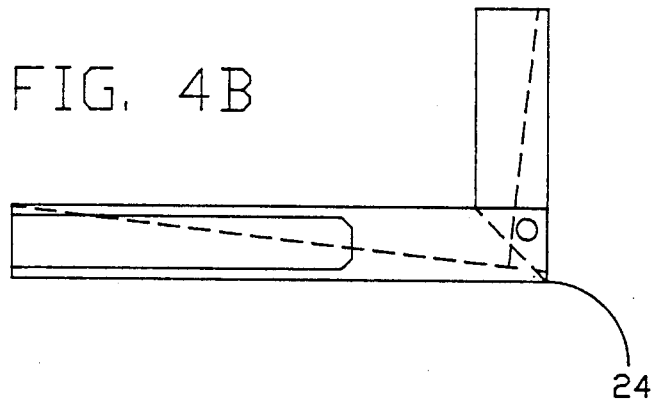
FIG. 4B is an end elevation view of the rack, shown in FIG. 2. in the closed position, showing, in phantom lines the article supporting surfaces.
Figure 4A:
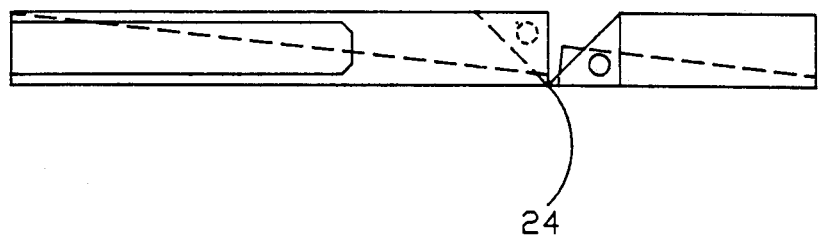
FIG. 4A is an end elevation view of the rack, shown in FIG. 1 in the flat or open position illustrating, in phantom lines, the two article supporting surfaces. Also shown in FIG. 4A, in phantom and solid lines, are the rack's locking elements of either the left or right end faces.
Figure 5A:
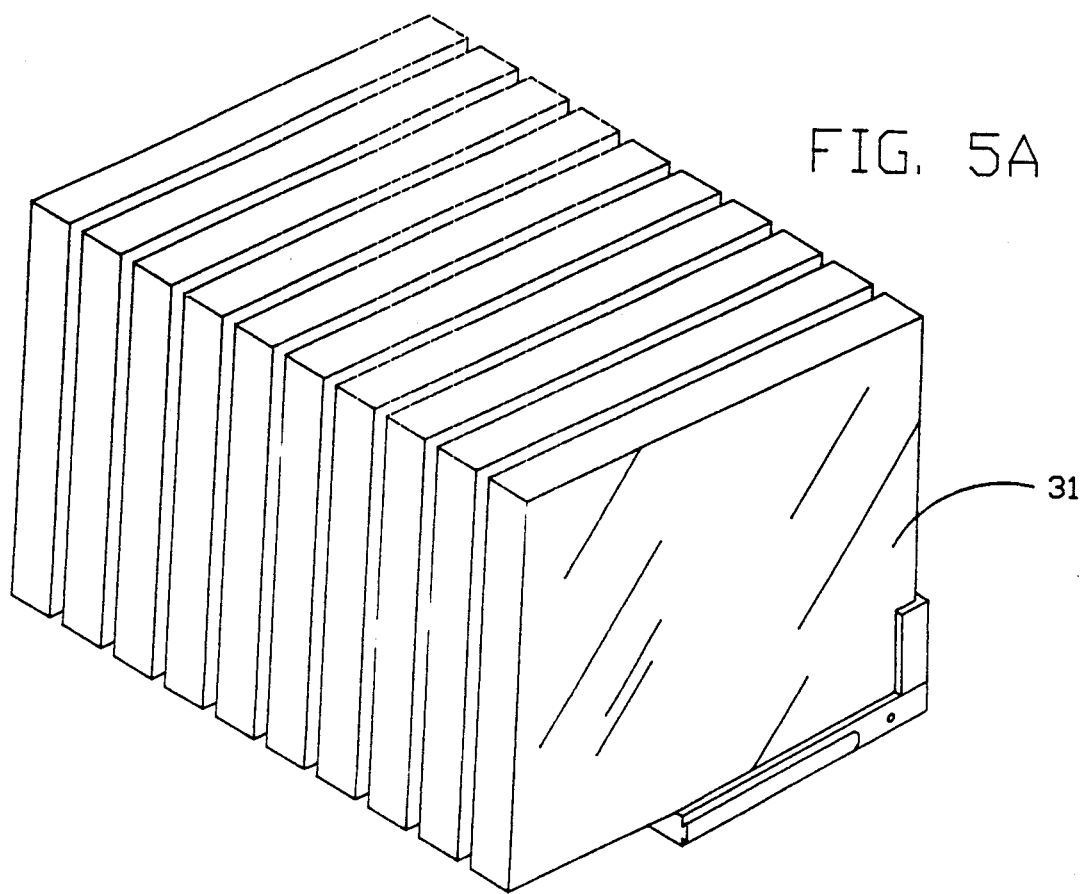
FIG. 5 is an elevation view of the rack, shown in FIG. 2, in the closed position showing an object or container of right parallelepiped configuration held in the rack.
Figure 5B:
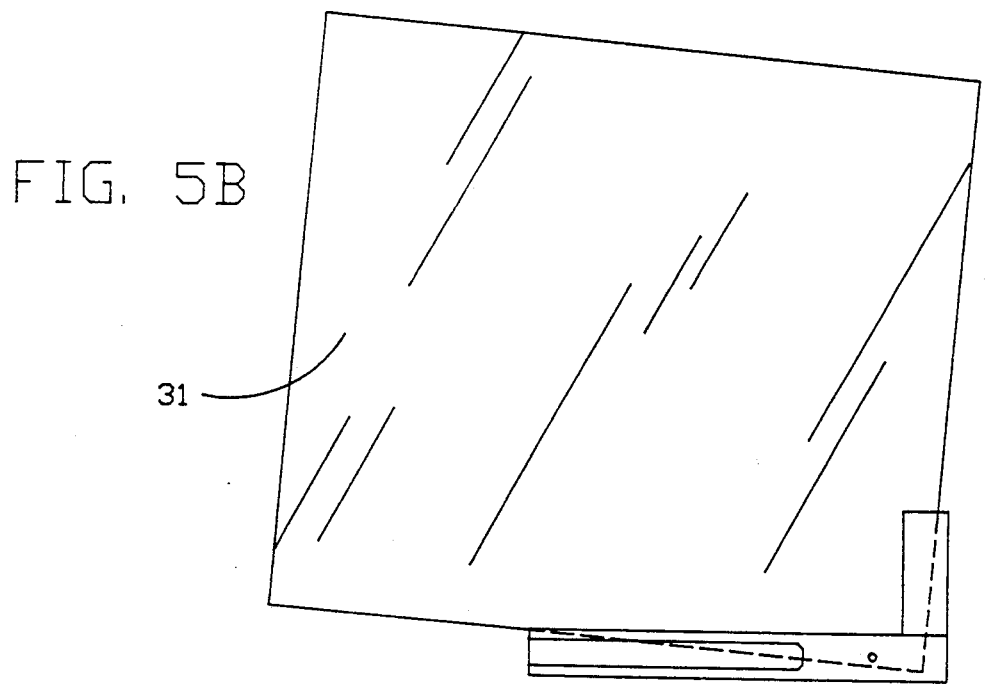

The rack 9 utilizes a hinging mechanism as shown in FIG. 3. The hinge consists of a relatively thin member of the material of construction and is an integral part of the invention. Said hinge lies in the same horizontal plane as both the forward entity lower side 11A and the rear entity lower side 11B and is defined by the left end faces 14A and 14B and the right end faces 15A and 15B of the invention.

The rack 9 utilizes a coupling mechanism to join two or more said racks together in a contiguous fashion. Said coupling mechanism consists of a dovetail shaped cavity that has been recessed into the surface of the forward entity's left end face 14A and extends horizontally to the rear from the terminus of the front side 13A and the left end face to a point approximately two thirds of the length of the forward entity 10A. Projecting from the right end face 15A of the forward entity is a dovetail shaped protrusion which lies parallel to said end face 15A and extends rearward from the terminus of the front side 13A and the right end face 15A to a point approximately two thirds of the length of the forward entity 10A.

OPERATION OF THE INVENTION

When the rear entity 10B is rotated, by means of the hinge 24, to a generally vertical position the rear article supporting surface 23 and the forward article supporting surface 22 define a right angle for the acceptance of an article of right parallelepiped configuration.

The hinge serves to join the forward and rear entities together as well as acting as a pivot point to align said entities to each other in a perpendicular fashion as shown in FIG. 2. Because the hinge mechanism 24 is, essentially, a very thin member of the material of construction, it must have the ability to bend at an acute angle without fracturing. A synthetic plastic, such as polyethalene, would be suitable for this purpose.

When the rear entity 10B is rotated to a generally vertical position, a locking mechanism is engaged when the right locking ball 30A and the left locking ball 29A are seated into the right locking socket 30B on the right locking tab 28 and the left locking socket 29B on the left locking tab 27 respectively. Lateral tension created by the locking tabs 27 and 28, resistance to flexing due to the construction materials inherent stiffness tends to prevent the right and left locking balls 29A and 30A from dislocating from the right and left locking sockets 29B and 30B, thereby securing the rear entity 10B in its generally vertical position. Furthermore, when two or more racks are coupled together by means of their respective coupling mechanisms the close fitting relationship of the racks prevents the left and right locking tabs 27 and 28 from flexing thereby securely locking the rear entity in its upright position.

When the dovetail shaped protrusion on the right end face of the forward entity 10A on one rack is inserted into the dovetail shaped cavity that is recessed into the left end face of the forward entity of another rack 10A and slid horizontally towards the rear of said entity until the ball 19 positioned towards the rear of the right end face of the former rack seated into the socket 18 positioned towards the rear of the left end face of the latter rack, the two 17 racks are securely joined together.

When the rack 9 is in its upright or closed position, the rack 9 is ready to accept an object or container of right or parallelepiped configuration. The object or container slides into and seats into the groove created by the forward article supporting surface 22 and the rear article supporting surface 23. The removal of the object or container is facilitated by exerting downward pressure on the forward upward corner of said object or container shifting the center of gravity forward causing it to pivot, on the edge, created by the forward entities front side 13A and article supporting surface 22, lifting the rear of the object or container out of said groove. The forward upper corner of the object or container can then be grasped to facilitate the lifting of the object or container from the groove with a minimal of wear or disruption to the surface of the object or container.

What is claimed is

1. A storage rack for storing an article of right parallelepiped configuration, said storage rack comprising:
   a first member having a longitudinal axis;
   a second member having a longitudinal axis;
   each said member comprising a groove extending along said longitudinal axis, opposing lateral sides, and proximate and distal ends, said groove having a base defining an article supporting surface;
   said first and second members being connected by a hinge element at said proximate ends;
   said first member lateral sides having respective male and female connecting means to enable a plurality of said racks to be joined in side by side relation;
   said first and second members having respective latch means adjacent said proximate ends;
   said second member is adapted to be rotated about said hinge element to a position substantially orthogonal to said first member and is maintained in said position by said latch means thereby providing adjacent first and second grooves for supporting said parallelepiped article.

2. A plurality of storage racks for storing articles of right parallelepiped configuration in combination with at least one of said articles; said at least one article having a length and width, said storage racks each comprising:

a first member having a longitudinal axis;

a second member having a longitudinal axis;

each said member comprising a groove extending along said longitudinal axis, opposing lateral sides, and proximate and distal ends, said groove having a base defining an article supporting surface;

said first and second members being connected by a hinge element at said proximate ends;

said first member lateral sides having respective male and female connecting means whereby said plurality of said racks are joined in side by side relation;

said first and second members having respective latch means adjacent said proximate ends, wherein said second member is adapted to be rotated about said hinge element from a position substantially coaxial with said first member to a position substantially orthogonal to said first member and is maintained in said position by said latch means thereby providing adjacent first and second grooves for supporting said parallelepiped article;

said plurality of said racks, when in said substantially coaxial position, defining a length and a width substantially the same as said length and width of said article.

* * * * *